United States Patent
Miyamoto et al.

(10) Patent No.: US 9,519,389 B2
(45) Date of Patent: Dec. 13, 2016

(54) LIQUID CRYSTAL DISPLAY DEVICE WITH TOUCH PANEL

(71) Applicant: Japan Display Inc., Tokyo (JP)

(72) Inventors: Motoharu Miyamoto, Tokyo (JP); Takahiro Ochiai, Tokyo (JP); Yoshinori Aoki, Tokyo (JP); Hideo Sato, Tokyo (JP)

(73) Assignee: Japan Display Inc., Tokyo (JP)

( * ) Notice: Subject to any disclaimer, the term of this patent is extended or adjusted under 35 U.S.C. 154(b) by 114 days.

(21) Appl. No.: 14/463,710

(22) Filed: Aug. 20, 2014

(65) Prior Publication Data

US 2015/0054781 A1    Feb. 26, 2015

(30) Foreign Application Priority Data

Aug. 21, 2013  (JP) ................................. 2013-171762

(51) Int. Cl.
G06F 3/041  (2006.01)
G06F 3/044  (2006.01)
G09G 3/20   (2006.01)

(52) U.S. Cl.
CPC ............. *G06F 3/044* (2013.01); *G06F 3/0412* (2013.01); *G06F 3/0416* (2013.01); *G09G 3/20* (2013.01); *G09G 2230/00* (2013.01); *G09G 2300/023* (2013.01); *G09G 2300/0426* (2013.01); *G09G 2310/0267* (2013.01); *G09G 2310/062* (2013.01); *G09G 2310/063* (2013.01)

(58) Field of Classification Search
CPC ....................................................... G06F 3/044
USPC .................................................. 345/173, 174
See application file for complete search history.

(56) References Cited

U.S. PATENT DOCUMENTS

| 2007/0070020 | A1  | 3/2007  | Edo et al. |
| 2010/0182273 | A1  | 7/2010  | Noguchi et al. |
| 2013/0342478 | A1* | 12/2013 | Bae et al. ...................... 345/173 |
| 2014/0055411 | A1* | 2/2014  | Zhao ............................. 345/174 |

FOREIGN PATENT DOCUMENTS

| JP | 2007-95190 A   | 4/2007  |
| JP | 2009-244958 A  | 10/2009 |

* cited by examiner

*Primary Examiner* — Amare Mengistu
*Assistant Examiner* — Joseph G Rodriguez
(74) *Attorney, Agent, or Firm* — Typha IP LLC

(57) ABSTRACT

A display device with a touch panel includes: a plurality of scanning signal lines, which are aligned in a rectangular display region and in parallel with a side of the rectangular display region, to which an active potential as a potential for making a pixel transistor conductive is applied; drive pulse output circuits which sequentially apply the active potential to the scanning signal lines in the display region; a clock signal output circuit which applies a first clock signal as a clock signal for the drive pulse output circuits to a first clock signal line and stops the application of the first clock signal to the first clock signal line for a stop period during which the sequential application of the active potential is stopped in the middle thereof; and a touch panel control unit which detects contact with a display surface during the stop period.

5 Claims, 16 Drawing Sheets

LIQUID CRYSTAL DISPLAY DEVICE WITH TOUCH PANEL

CROSS-REFERENCE TO RELATED APPLICATION

The present application claims priority from Japanese application JP2013-171762 filed on Aug. 21, 2013, the content of which is hereby incorporated by reference into this application.

BACKGROUND OF THE INVENTION

1. Field of the Invention

The present invention relates to a liquid crystal display device with a touch panel.

2. Description of the Related Art

An information communication terminal such as a computer, in which a touch panel arranged so as to be overlapped on a display screen is used as an input device has widely been used. A liquid crystal display device which is widely used as a display device is a device which displays an image by changing the orientation of liquid crystal compositions sealed between two substrates, namely a thin film transistor substrate (hereinafter, referred to as a "TFT substrate") and a color filter substrate, by variations in an electric field and controlling the degree of light transmission passing through a liquid crystal panel. According to an in-plane switching (IPS) scheme in which both a pixel electrode and a common electrode are arranged on the side of the TFT substrate, in particular, a so-called lateral electric field is formed, and display with a wide view angle is realized.

A touch panel is an input device which causes a processing apparatus to perform processing by recognizing coordinates on the panel touched with a finger or the like of a user. For the touch panel, a resistance film scheme in which variations in a resistance value at a touched part is detected, an optical sensor scheme in which variations in light amount at a part blocked by touching is detected, an electrostatic capacity coupling scheme in which variations in capacity are detected, and the like are known. The electrostatic capacity coupling scheme has been widely used in terms of high transmittance of the panel without degrading display quality, and there is no occurrence of contact with other electrodes, which brings about high durability, for example.

JP 2009-244958A discloses a liquid crystal display device with a touch panel of the IPS scheme, the thickness of which is reduced by using a common electrode of the liquid crystal display device as a drive electrode of the touch panel. JP 2007-095190A discloses a shift register circuit which is used in a display device such as a liquid crystal display device.

SUMMARY OF THE INVENTION

A touch detecting operation in a display device with a touch panel, such as a liquid crystal display device with a touch panel, is performed during a period with no variation in potential of a scanning signal line of the display device in many cases in order to avoid mixing of noise due to the variations in potential of the scanning signal lines. As the period with no variation in potential, a period during which scanning is temporarily stopped in the middle of the scanning of the scanning signal line may be provided as well as the period during which the scanning signal line is not scanned.

The present invention was made in view of the above circumstances, and an object thereof is to provide a display device with a touch panel capable of temporarily stopping and restarting scanning in the middle of the scanning of scanning signal lines.

According to an aspect of the present invention, there is provided a display device with a touch panel including: a plurality of scanning signal lines, which are aligned in a rectangular display region and in parallel with a side of the rectangular display region, to which an active potential as a potential for making a pixel transistor conductive is applied; at least one drive pulse output circuit which sequentially applies the active potential to the plurality of scanning signal lines in the display region; a clock signal output circuit which applies a first clock signal as a clock signal for the drive pulse output circuits to a first clock signal line and stops the application of the first clock signal to the first clock signal line for a stop period during which the sequential application of the active potential is stopped in the middle thereof; and a touch panel control unit which detects contact with a display surface during the stop period.

In the aspect, the display device with a touch panel may further include at least one reset start signal generation circuit which generates and outputs a reset signal for resetting the finally applied active potential to a non-active potential when the sequential application of the active potential is stopped in the middle and a start signal for restarting the stopped sequential application of the active potential from the middle, and the clock signal output circuit may supply a second clock signal, which is a clock signal with a lower frequency than that of the first clock signal, to the reset start signal generation circuits.

In the aspect, the drive pulse output circuit may be arranged on the same substrate as a substrate, on which the plurality of scanning signal lines are formed, on an outer side of the rectangular display region, and the reset start signal generation circuits may be arranged on the same substrate as the substrate, on which the plurality of scanning signal lines are formed, on a further outer side than the drive pulse output circuits.

In the aspect, the at least one drive pulse output circuit may comprise a plurality of drive pulse output circuits, the at least one reset start signal generation circuit may comprise a plurality of reset start signal generation circuits, the drive pulse output circuits may be respectively arranged at two locations outside facing sides of the rectangular display region and sequentially apply the active potential to odd-numbered scanning signal lines and even-numbered scanning signal lines, respectively, and the reset start signal generation circuits may be respectively arranged on a further outer side than the drive pulse output circuits arranged at the two locations outside the facing sides and supply the reset signal and the start signal to the drive pulse output circuits at the two locations, respectively.

In the aspect, the reset start signal generation circuit may include a multi-stage circuit block as a circuit for sequentially outputting the active potential, and a circuit block corresponding to a part of the stages may output the reset signal or the start signal to the scanning signal lines.

In the aspect, the display device may be a liquid crystal display device which controls an amount of transmitted light by controlling orientation of liquid crystal compositions by an electric field formed between a pixel electrode and a common electrode, the common electrode may be divided into a plurality of electrodes, and at least a part of the plurality of electrodes may be one of a pair of electrodes which forms capacity for detecting the contact.

DETAILED DESCRIPTION OF THE INVENTION

Figure 1:
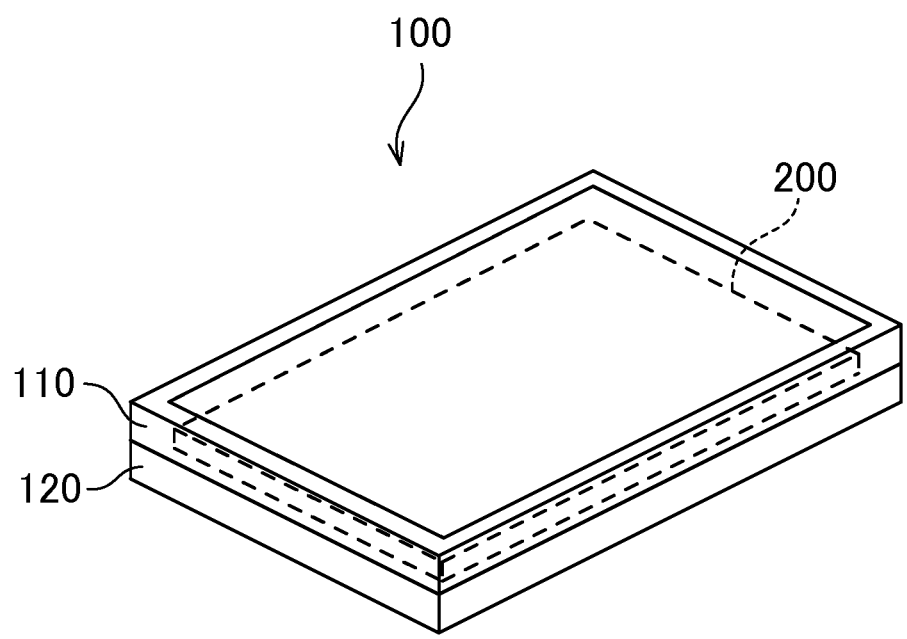
FIG. 1 is a diagram showing a liquid crystal display device with a touch panel according to a first embodiment of the invention.

Hereinafter, a description will be given of embodiments of the invention with reference to drawings. In addition, the same reference numerals are given to the same or similar elements in the drawings, and repeated descriptions will be omitted.

First Embodiment

FIG. 1 is a diagram showing a liquid crystal display device with a touch panel 100 according to a first embodiment of the invention. As shown in the drawing, the liquid crystal display device with a touch panel 100 includes a liquid crystal display panel with a touch panel 200, and an upper frame 110 and a lower frame 120 which are fixed so as to interpose the liquid crystal display panel with a touch panel 200 therebetween.

Figure 2:
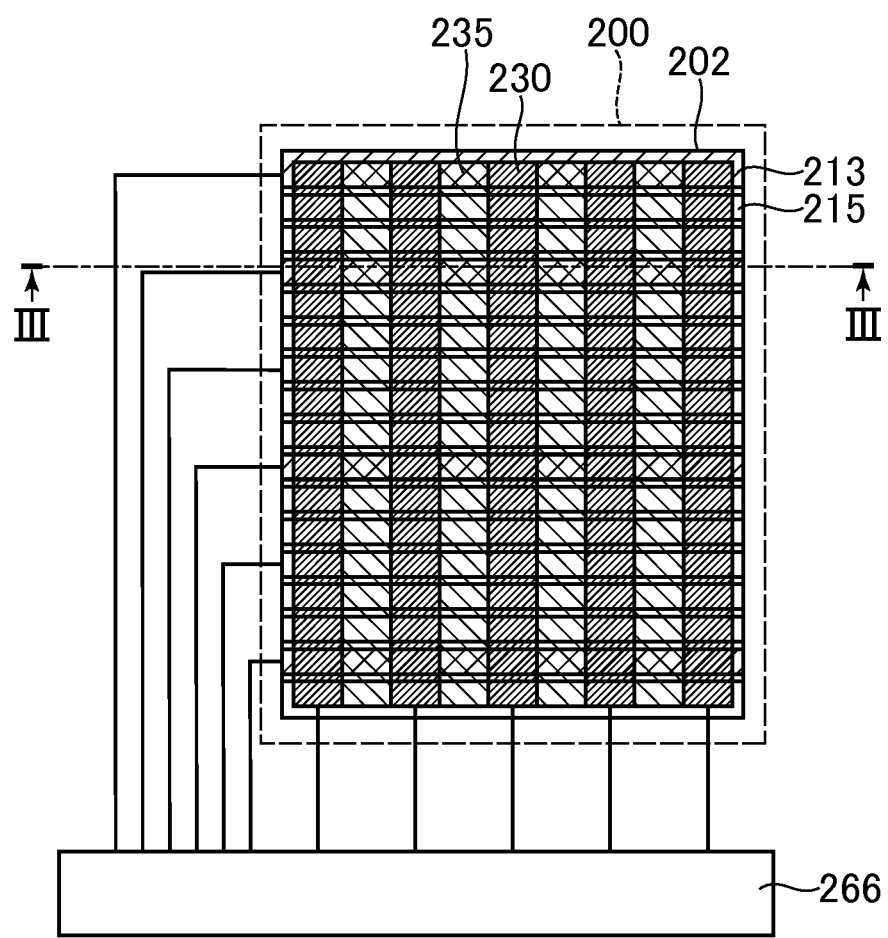
FIG. 2 is a planar view showing an arrangement of electrodes which are used for touch detection of the touch panel.

FIG. 2 is a planar view showing an arrangement of electrodes which are used for touch detection of the touch panel. Common electrodes used for liquid crystal display are comprised of drive electrodes 213 and non-drive electrodes 215. Each of the drive electrodes 213 has a strip shape extending in a shorter side direction of a display region 202 and is applied a drive signal TX from a touch panel control unit 266. The non-drive electrodes 215 are electrodes other than the drive electrodes 213 and have strip shapes extending in the shorter side direction of the display region. The drive electrodes 213 and the non-drive electrodes 215 are arranged so as to be spread in the display region 202.

In contrast, a plurality of detection electrodes 230 and a plurality of dummy electrodes 235 are formed in a layer which is different from the layer where the common electrodes are arranged. The detection electrodes 230 extend in a longer side direction of the display region 202 and are aligned in the shorter side direction of the display region 202. The dummy electrodes 235 are arranged between the respective detection electrodes 230 and extend and are aligned in the same direction as that of the detection electrodes 230. Signals detected by the detection electrodes 230 are input from each of the detection electrodes 230 to the touch panel control unit 266, and touch coordinates are computed. The dummy electrodes 235 may be electrically floating or grounded. In the case where the dummy electrodes 235 are electrically floating, the dummy electrodes 235 have a function as auxiliary capacitance for touch detection. In addition, each of the drive electrodes 213, the non-drive electrodes 215, the detection electrodes 230, and the dummy electrodes 235 is formed by using a transparent conductive material such as indium tin oxide (ITO). In addition, each electrode may be configured as a bundle of a plurality of conductive lines arranged at a predetermined interval.

In addition, the touch panel control unit 266 includes a circuit which sequentially applies a drive pulse to each of the drive electrodes 213, a detection circuit which integrates signals detected by the detection electrodes 230, a register which stores control parameters such as a drive pulse output timing, and a computation unit which computes whether or not a touch operation has been performed and a touch position on the display screen based on an output from the detection circuit, although not shown in the drawing.

Figure 3:
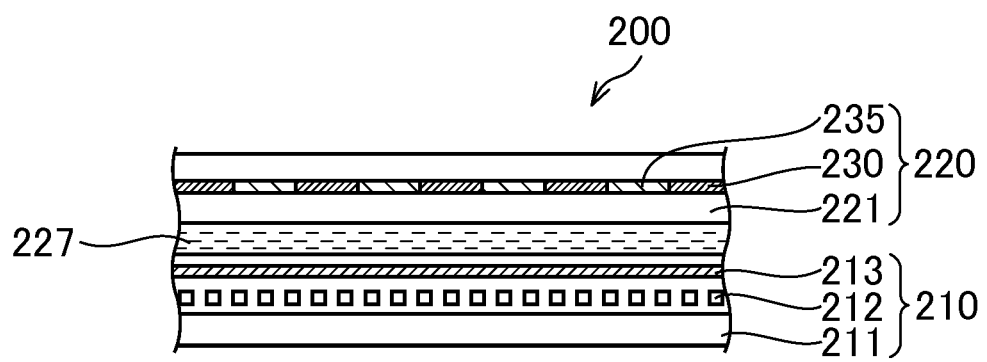
FIG. 3 is a cross-sectional view taken along the line III-III in FIG. 2.

FIG. 3 schematically shows a cross-sectional view taken along the line III-III in FIG. 2. As shown in the drawing, the liquid crystal display panel with a touch panel 200 includes a TFT substrate 210 in which a thin film transistor (not shown) is formed and a circuit for controlling orientation of liquid crystals is formed for each of pixels arranged in a matrix shape, a rectangular facing substrate 220 in which a color filter (not shown) is formed to output incident light as light with a wavelength of each of RGB colors for each pixel, and a liquid crystal layer 227 which is sealed between these substrates and is formed by a liquid crystal composition. Here, a pixel electrode 212 is formed on a glass substrate 211, and further, the drive electrodes 213 and the non-drive electrodes 215 (see FIG. 2) which function as common electrodes for liquid crystal display are formed on the TFT substrate 210 as shown in FIG. 3. On the facing substrate 220, the detection electrodes 230 and the dummy electrodes 235 are formed on a glass substrate 221.

Figure 4:
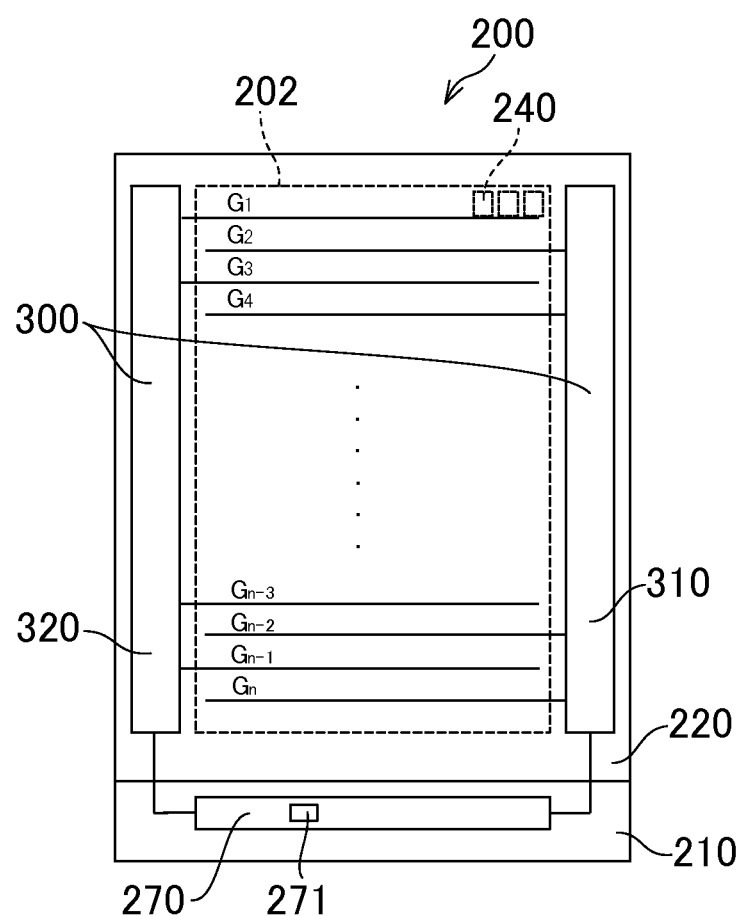
FIG. 4 is a diagram showing a configuration of a circuit for display on a liquid crystal panel in FIG. 1.

FIG. 4 shows a configuration of a circuit for display on the liquid crystal display panel 200 in FIG. 1. As described above with reference to FIG. 3, the liquid crystal display panel 200 includes the two substrates, namely the thin film transistor (TFT) substrate 210 and the facing substrate 220, and the liquid crystal composition is sealed between these substrates. The TFT substrate 210 includes a drive circuit 300 and a drive integrated circuit (IC) 270. The drive circuit 300 sequentially applies a high potential (active potential) to scanning signal lines G1 to Gn. The high potential makes electrically conductive between a source and a drain of a TFT arranged in each pixel 240. The drive IC 270 applies a voltage corresponding to a grayscale value of each pixel 240 to video signal lines (not shown), which extend so as to orthogonally intersect the scanning signal lines G1 to Gn in the display region 202, and controls the drive circuit 300. In addition, the drive circuit 300 includes a left-side drive circuit 320, which is shown on the left side of the display region 202 in the drawing and sequentially applies the high potential to odd-numbered scanning signal lines Gi (i is an odd number), and a right-side drive circuit 310, which is shown on the right side of the display region 202 and sequentially applies the high potential to even-numbered scanning signal lines Gi (i is an even number). Moreover, the drive IC 270 includes a clock signal output circuit 271 which generates and outputs a clock signal to be input to the drive circuit 300.

Figure 5:
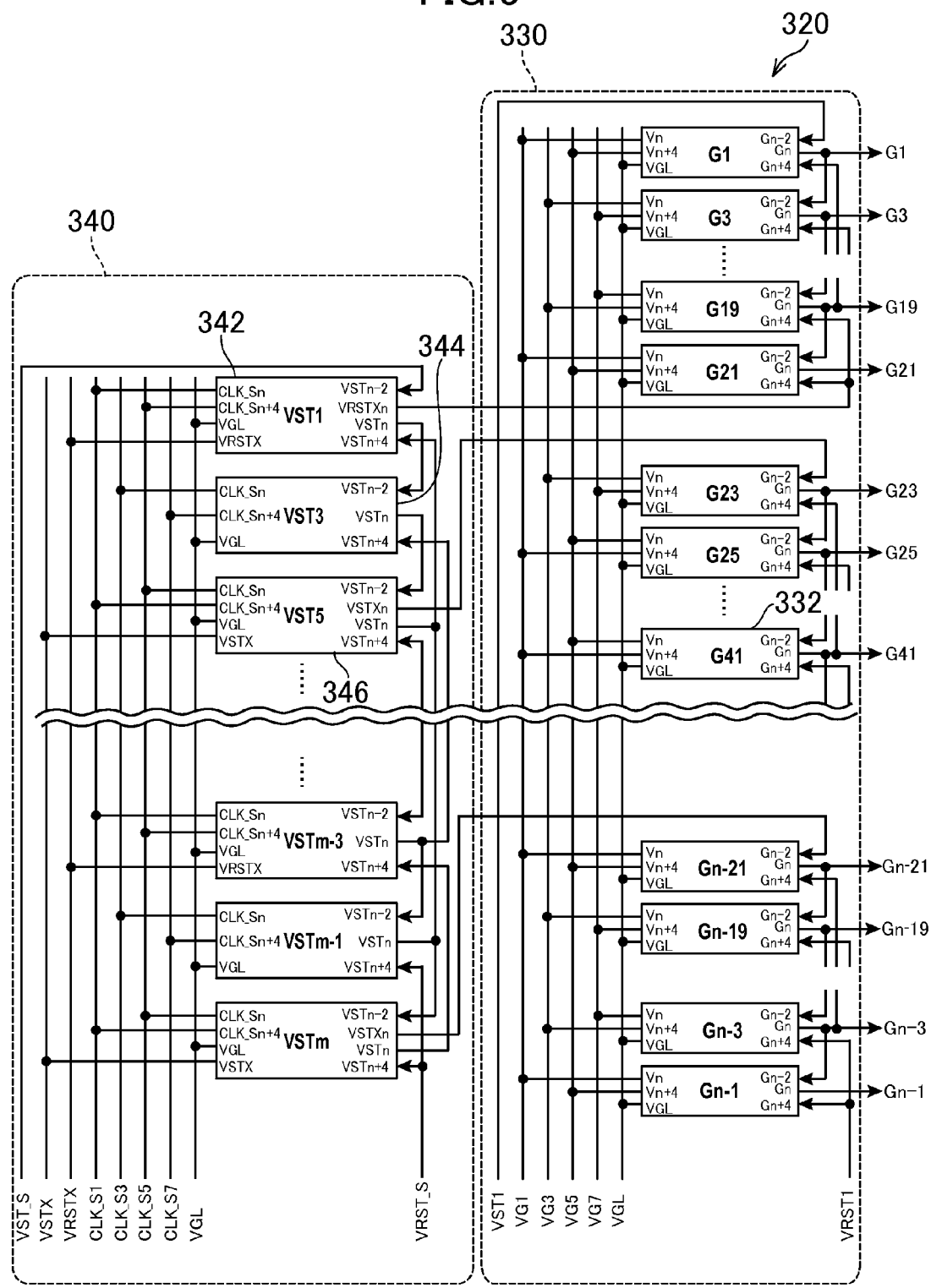
FIG. 5 is a circuit diagram schematically showing a configuration inside a left-side drive circuit in FIG. 4.

FIG. 5 is a circuit diagram schematically showing a configuration inside the left-side drive circuit 320 in FIG. 4. As described above, the left-side drive circuit 320 is included in the drive circuit 300 for outputting the high potential to the odd-numbered scanning signal lines Gi, and the right-side drive circuit 310 has the same configuration as that of the left-side drive circuit 320 other than that the right-side drive circuit 310 outputs the high potential to the even-numbered scanning signal lines Gi. As shown in the drawing, the left-side drive circuit 320 includes a drive pulse output circuit unit 330, which sequentially outputs the high potential to the scanning signal lines Gi (i is an odd number), and a reset start signal generation circuit unit 340, which stops and restarts the sequential output by the drive pulse output circuit unit 330. The drive pulse output circuit unit 330 includes output circuit blocks 332, the number of which is at least equal to the number of scanning signal lines Gi as output targets. In addition, the reset start signal generation circuit unit 340 includes a transfer circuit block 344, a reset circuit block 342 and a start circuit block 346. The transfer circuit block 344 includes a circuit to be used by the respective circuit blocks in the reset start signal generation circuit unit 340 to perform the sequential output. The reset circuit block 342 includes the circuit of the transfer circuit block 344, and generates and outputs a reset signal VRSTXj for fixing a finally applied active potential at a non-active potential when the sequential application of the active potential to the scanning signal lines Gi is stopped in the middle of the application. The start circuit block 346 includes the circuits of the transfer circuit block 344, and generates and outputs a start signal VSTXj for restarting the stopped sequential application of the active potential from the middle of the application.

Figure 6:
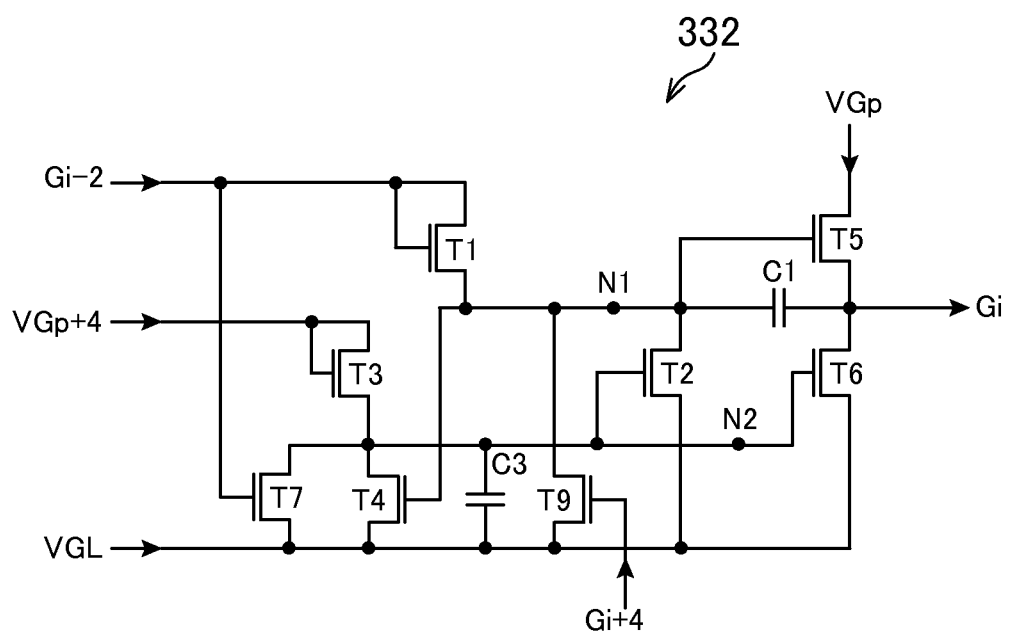
FIG. 6 is a circuit diagram showing a detail of an output circuit block which outputs a high potential to scanning signal lines.

FIG. 6 is a circuit diagram showing a detail of the output circuit block 332 for outputting the high potential to the scanning signal lines Gi. A description will be given of an operation of the output circuit block 332. If a potential of a scanning signal line Gi−2, to which a high potential is output earlier than the scanning signal line Gi by two horizontal drive periods, becomes a high potential, a transistor T7 is conducted since the scanning signal line Gi−2 is input to a gate of the transistor T7. Consequently a node N2 is connected to VGL, and a potential of the node N2 becomes a low potential. In addition, since the scanning signal line Gi−2 is also input to a diode-connected transistor T1, a potential of a node N1 connected thereto becomes a high potential. Consequently a potential difference occurs in a capacitor C1, and a transistor T5 is conducted. Since the node N1 is also connected to a gate of a transistor T4, the node N2 is connected to the VGL even by the transistor T4, and the potential of the node N2 becomes a low potential.

Next, if a potential of a clock signal VGp (p is 1, 3, 5, or 7) becomes a high potential, a potential of one electrode of the capacitor C1 becomes a high potential since the transistor T5 is conducted. And because the gate of the transistor T5 is connected to the other electrode of the capacitor C1, a gate potential of the transistor T5 is further boosted by a so-called bootstrap. With such a configuration, the scanning signal lines Gi is set to the high potential. If the potential of the clock signal VGp becomes a low potential, then the potential of the scanning signal lines Gi also becomes a low potential. In order to fix the state, a scanning signal line Gi+4, the potential of which becomes a high potential with delay, is input to a gate of a transistor T9, and thereby, the transistor T9 is conducted, the node N1 is connected to the VGL, and the potential of the node N1 becomes a low potential. In contrast, a clock signal VGp+4, the potential of which becomes a high potential at the same time with the scanning signal line Gi+4, is input to a diode-connected transistor T3, and the potential of the node N2 becomes a high potential.

Figure 7:
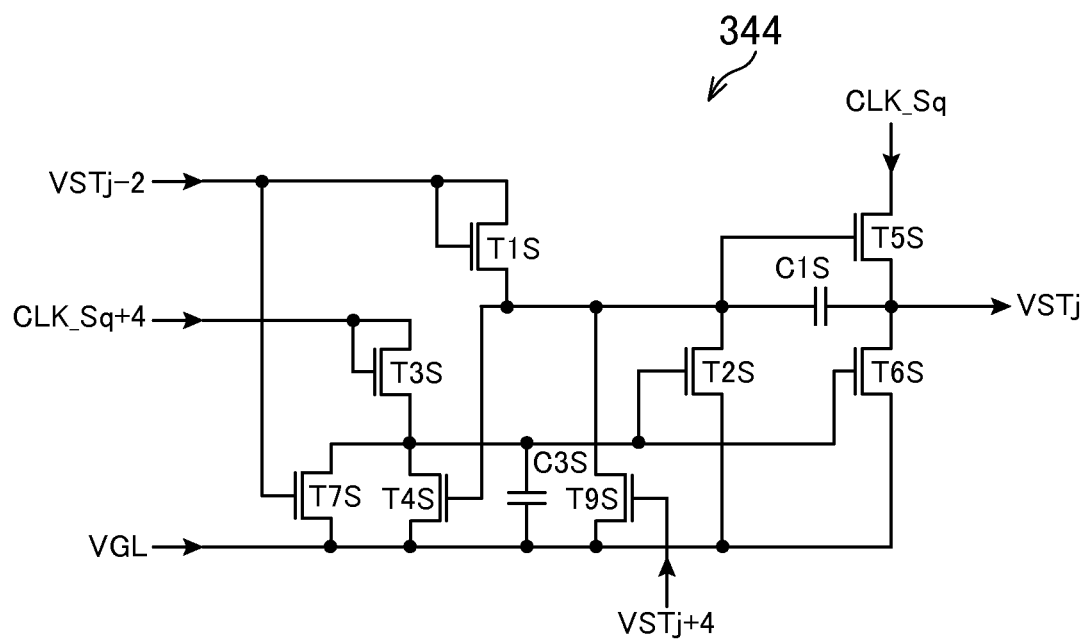
FIG. 7 is a circuit diagram showing a detail of a transfer circuit block in a reset start signal generation circuit unit which outputs a transfer signal.

FIG. 7 is a circuit diagram showing a detail of the transfer circuit block 344 in the reset start signal generation circuit unit 340 which outputs a transfer signal VSTj. Since the circuit is the same as the above circuit other than that a clock signal CLK_Sj operates at a lower frequency than that of the aforementioned clock signal Vi, a description of an operation thereof will be omitted.

Figure 8:
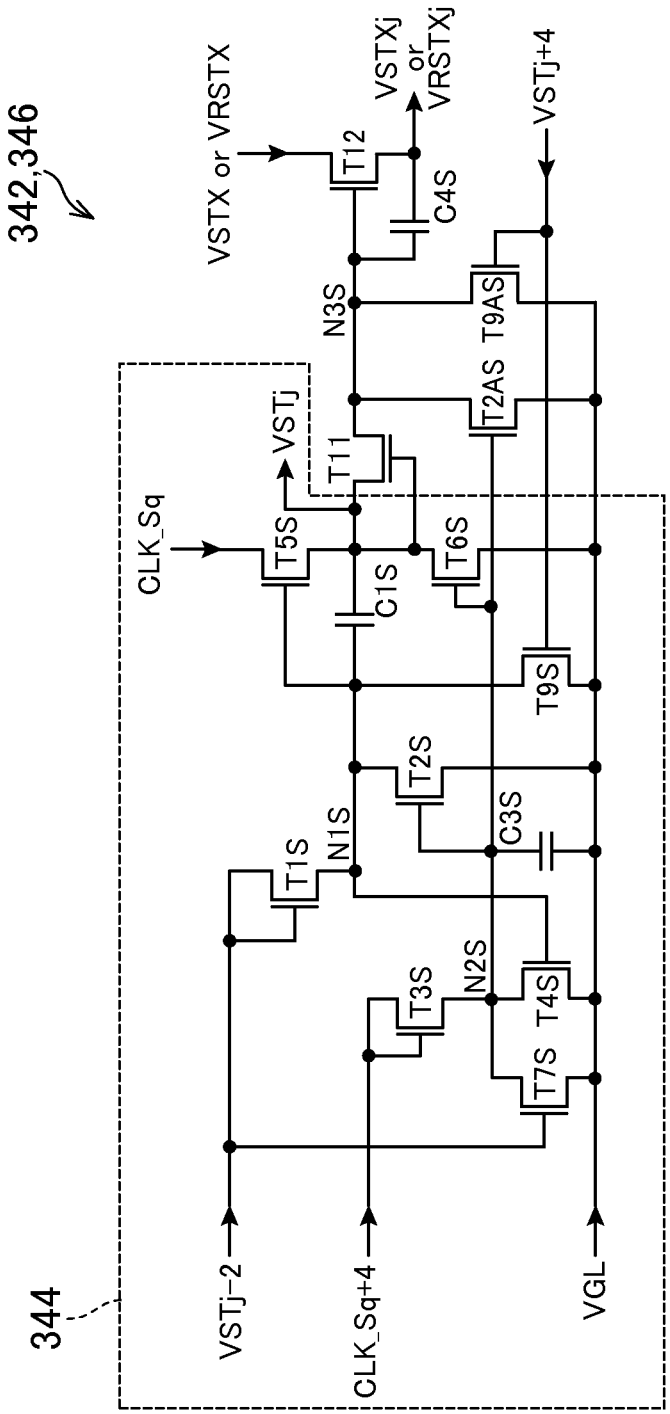
FIG. 8 is a circuit diagram showing a detail of a reset circuit block and a start circuit block.

FIG. 8 is a circuit diagram showing details of the reset circuit block 342 and the start circuit block 346. Basically the same circuits are used for the reset circuit block 342 and the start circuit block 346. The reset circuit block 342 outputs the reset signal VRSTXj that is an input signal of the scanning signal line Gi+4 to the output circuit block 332 as shown in FIG. 5. The start circuit block 346 outputs the start signal VSTXj that is an input signal of the scanning signal line Gi−2 to the output circuit block 332. As described above, the reset circuit block 342 and the start circuit block 346 include the transfer circuit block 344. The output VSTj of the transfer circuit block 344 is input to a diode-connected transistor T11, and a potential of a node N3S connected to a gate of a transistor T12 becomes a high potential. As a result, the reset signal VRSTXj is output by an input of the input signal VRSTX in the case of the reset circuit block 342, and the start signal VSTXj is output by an input of the input signal VSTX in the case of the start circuit block 346. Transistors T2AS and T9AS are transistors for fixing the potential of the node N3S to a low potential such that a signal is not output during a period other than an output period.

Figure 9:
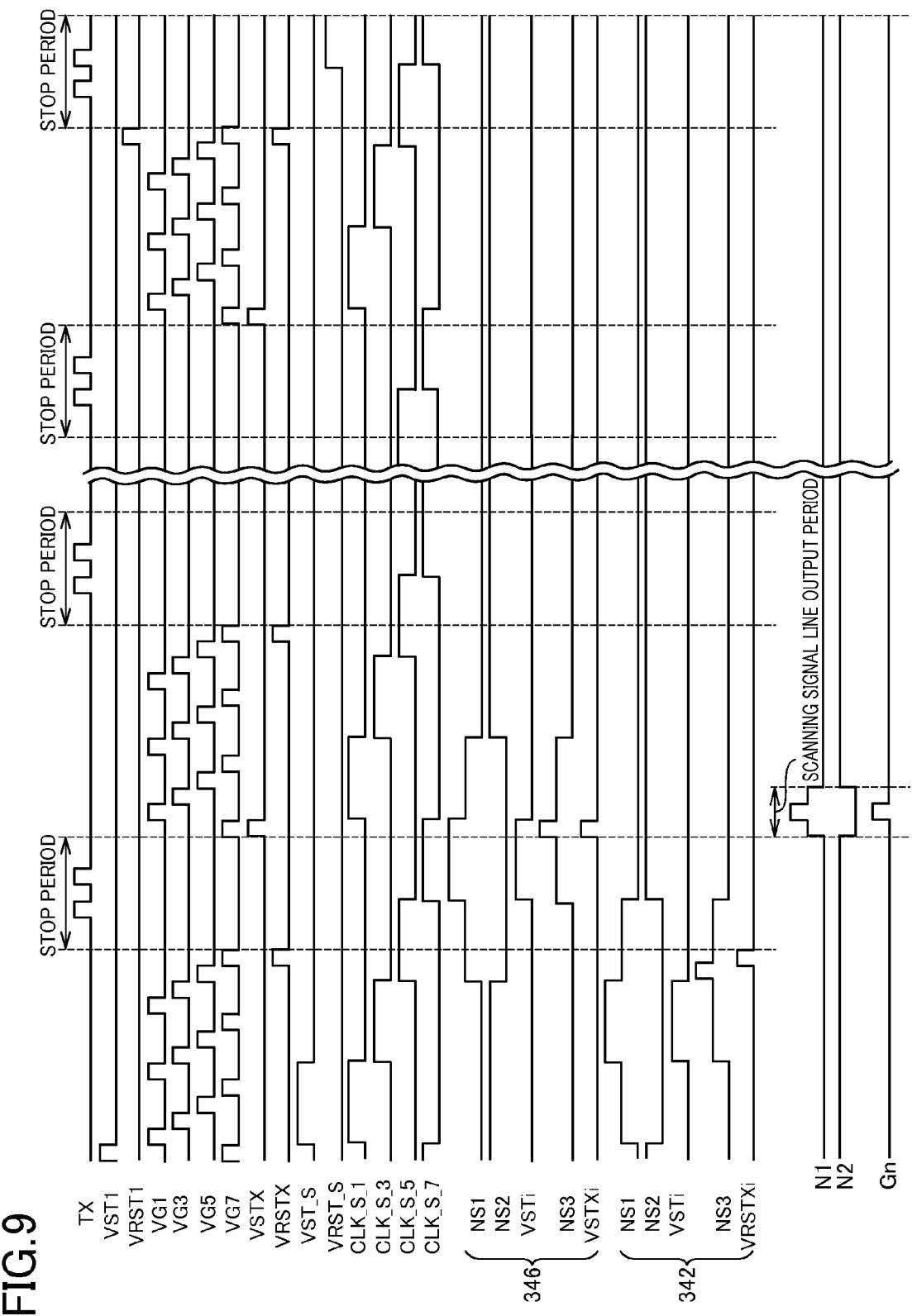
FIG. 9 is a timing chart showing variations in respective signals in the left-side drive circuit.

FIG. 9 is a timing chart showing variations in the respective signals of the left-side drive circuit 320. As shown in the timing chart, clock signals VG1, VG3, VG5, and VG7 which are generated and output by the clock signal output circuit 271 and are input to the drive pulse output circuit unit 330 form a four-phase clock signal, and an operation of sequentially outputting the clock signal to eleven scanning signal lines Gi, temporarily stopping the output, and outputting the clock signal again to the eleven scanning signal lines Gi after a stop period has passed is repeated. In contrast, clock signals CLK_S_1, CLK_S_3, CLK_S_5, and CLK_S_7, which are input to the reset start signal generation circuit unit 340, also form a four-phase clock signal which is generated and output by the clock signal output circuit 271. The clock signals CLK_S_1, CLK_S_3, CLK_S_5, and CLK_S_7 are clock signals with longer cycles than those of the clock signals VG1, VG3, VG5, and VG7 as shown in FIG. 9, and outputs thereof are not temporarily stopped even in the stop period. By operating the reset start signal generation circuit unit 340 with the clock signal CLK_S_q (q is 1, 3, 5, or 7) with a longer cycle than that of the clock signal VGp (p is 1, 3, 5, or 7) as described above, it is possible to reduce the number of circuit blocks formed inside, to reduce the scale of each transistor, and to thereby reduce the entire circuit scale.

The reset clock signal VRSTX is a signal, which is synchronized with the clock signal VG1, the potential of which becomes a high potential once in a period during which the potential of the clock signal VG1 becomes a high potential four times, and which is output as the reset signal VRSTXj via an appropriate reset circuit block 342. The start clock signal VSTX is a signal, which is synchronized with the clock signal VG7, the potential of which becomes a high potential once in a period during which the potential of the clock signal VG7 becomes a high potential four times, and which is output as the start signal VSTXj via an appropriate start circuit block 346.

By the reset signal VRSTXj and the start signal VSTXj, the respective output circuit blocks 332 in the drive pulse output circuit unit 330 can perform the sequential application to the scanning signal lines Gi while temporarily stopping the application. In addition, since the clock signals VG1, VG3, VG5, and VG7 are stopped in the period during which the sequential application to the scanning signal lines Gi is stopped, it is possible to suppress occurrence of noise due to a signal which is output to the scanning signal line Gi via the transistor 15 in FIG. 6. Accordingly, it is possible to perform the touch detection without being affected by noise generated in the drive circuit 300 by the touch panel control unit 266 generating the drive signal TX during the stop period.

Figure 10:
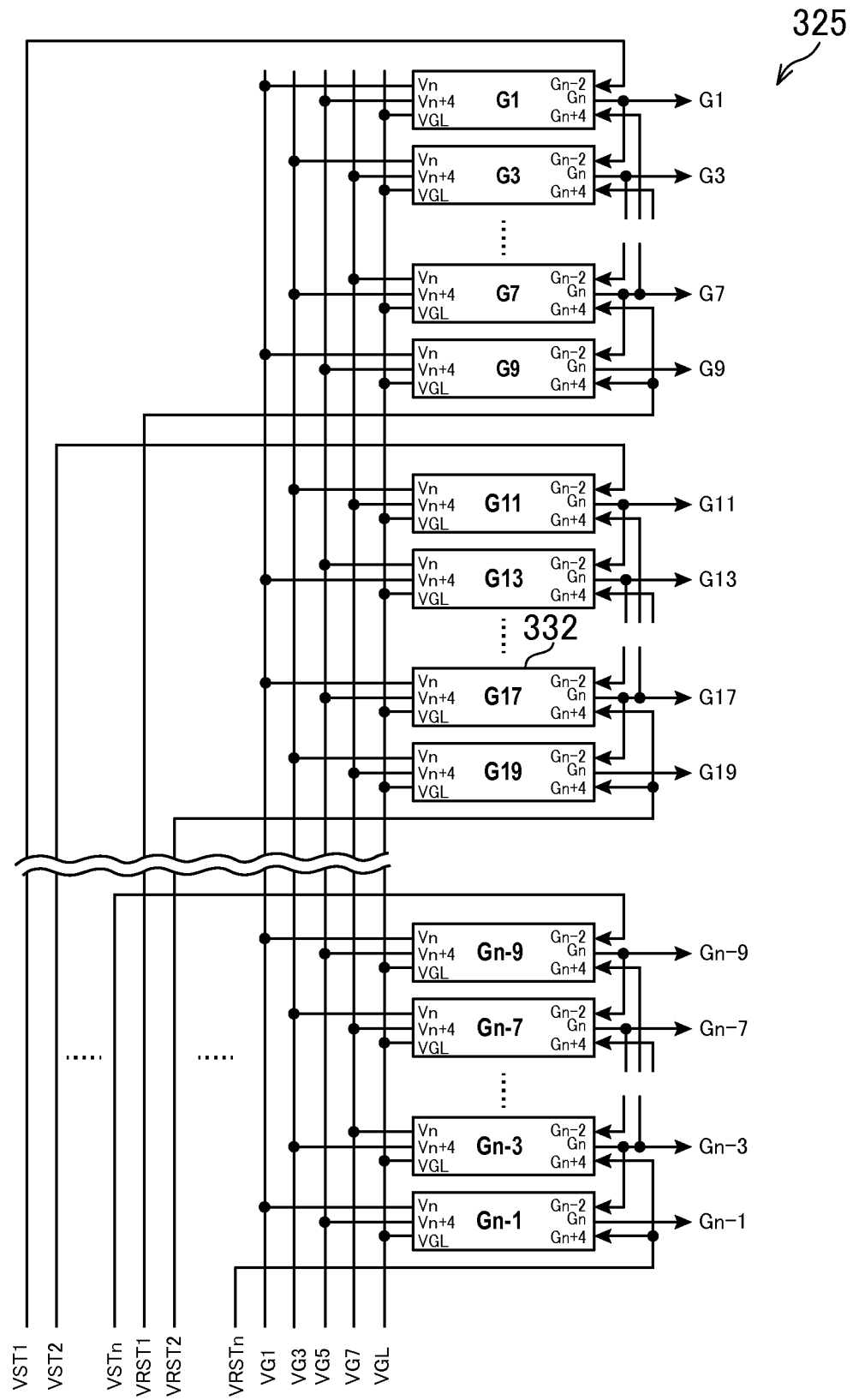
FIG. 10 is a circuit diagram schematically showing a configuration of a left-side drive circuit according to a comparative example.

FIG. 10 is a circuit diagram schematically showing a configuration of a left-side drive circuit 325 according to a comparative example of the embodiment. As compared with the left-side drive circuit 320 in FIG. 5, the reset start signal generation circuit unit 340 is not provided, and the start signal VSTXj and the reset signal VRSTXj which are generated by the drive IC 270 are utilized in the comparative example. Even in such a configuration, and furthermore, it is possible to provide the period during which the sequential application to the scanning signal lines Gi is stopped, and furthermore, it is possible to suppress occurrence of noise due to the signal output to the scanning signal lines Gi, by stopping the clock signals VG1, VG3, VG5, and VG7 during the stop period. However, since the number of wirings VST1 to VSTn outside the output circuit block 332 increases, a frame region formed outside the display region is expanded as a result, which brings about an increase in the entire size of the liquid crystal display panel 200. Thus, by providing the reset start signal generation circuit unit 340 which is operated based on the operation clock with a longer cycle than that of the operation clock of the drive pulse output circuit unit 330 as shown in FIG. 5, it is possible to achieve a smaller frame region than that in the case where the start signal VSTXj and the reset signal VRSTXj generated by the drive IC 270 are utilized by providing the wirings, and to thereby maintain the small size of the liquid crystal display panel 200.

Since the respective circuit blocks in the reset start signal generation circuit unit 340 have small circuit scales, it is possible to allocate the respective circuit blocks in a strip-like region extending along the direction of the scanning signal lines Gi at a short side of the display region instead of allocating together with the respective circuit blocks in the drive pulse output circuit unit 330 so as not to enlarge the frame region. In addition, a semiconductor circuit formed on the glass substrate 211 according to the embodiment may be made of any compound, but however, an amorphous semiconductor or a low-temperature polysilicon (LIPS) semiconductor is particularly preferable.

Second Embodiment

Figure 11:
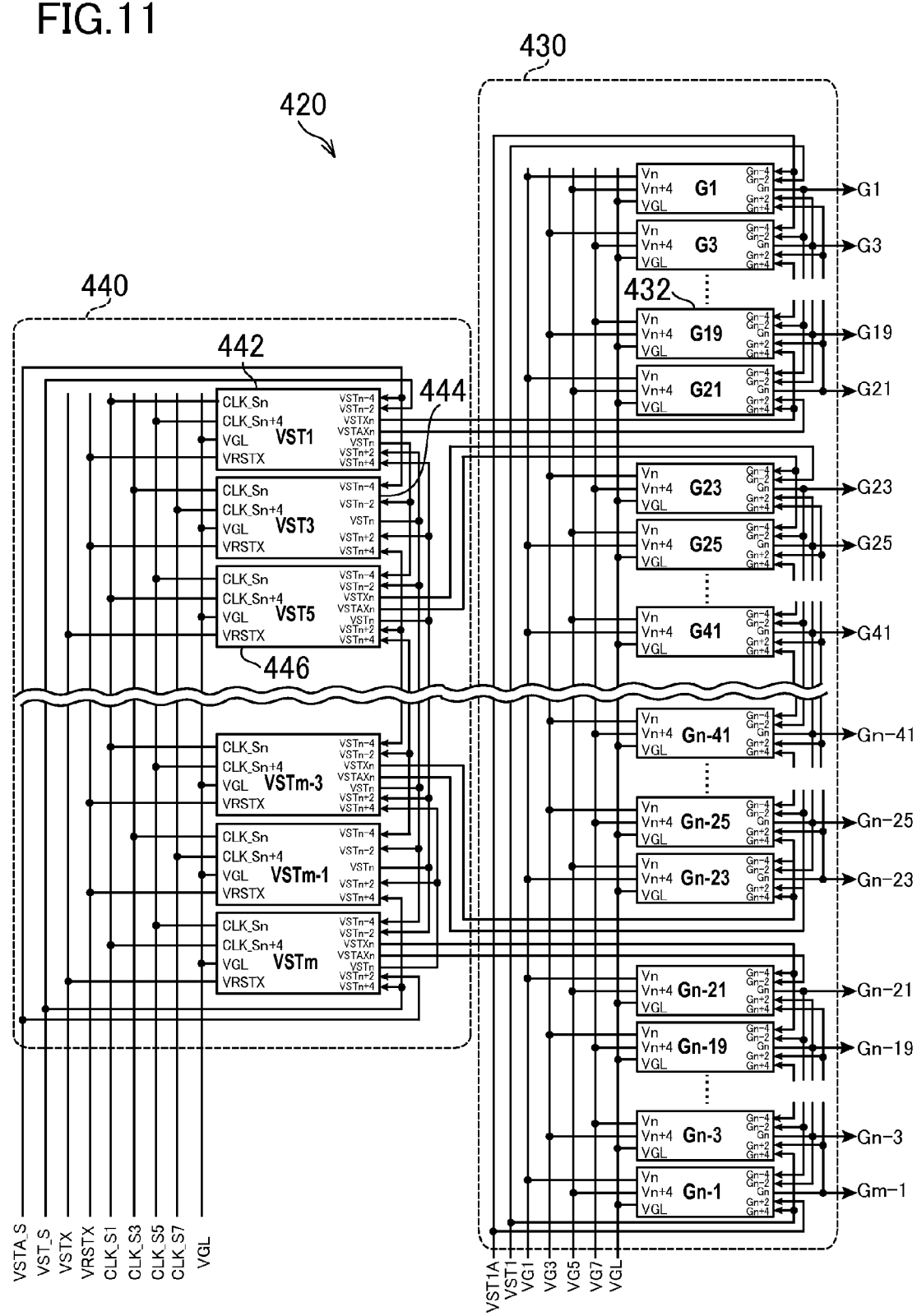
FIG. 11 is a circuit diagram schematically showing a configuration of a left-side drive circuit in a liquid crystal display device with a touch panel according to a second embodiment of the invention.

FIG. 11 is a circuit diagram schematically showing a configuration of a left-side drive circuit 420 in a liquid crystal display device with a touch panel according to a second embodiment of the invention. The liquid crystal display device with a touch panel according to the second embodiment is different from that in the first embodiment in that it is possible to perform backward scanning from the scanning signal line Gn to the scanning signal line G1 in addition to forward scanning from the scanning signal line G1 to the scanning signal line Gn. As shown in FIG. 11, the left-side drive circuit 420 includes a drive pulse output circuit unit 430 which sequentially outputs a high potential to scanning signal lines Gi (i is an odd number) and a reset start signal generation circuit unit 440 which stops and restarts the sequential output by the drive pulse output circuit unit 430 in the same manner as in the first embodiment.

The drive pulse output circuit unit 430 includes output circuit blocks 432, the number of which is at least equal to the number of the scanning signal lines Gi as output targets in the same manner as in the first embodiment. In addition, the reset start signal generation circuit unit 440 includes a transfer circuit block 444, a reset circuit block 442 and a start circuit block 446 in the same manner as in the first embodiment. The transfer circuit block 444 includes a circuit to be used by the respective circuit blocks in the reset start signal generation circuit unit 440 to perform the sequential output. The reset circuit block 442 includes the circuits of the transfer circuit block 444 and generates and outputs a reset signal VRSTXj for fixing a finally applied active potential at a non-active potential when forward-direction application of the active potential to the scanning signal lines Gi is stopped in the middle of the application. The start circuit block 446 includes the circuits of the transfer circuit block 444 and generates and outputs a start signal VSTXj for restarting the stopped forward-direction application of the active potential from the middle of the application. Here, in a case of scanning in the backward direction, the start circuit block 446 generates and outputs a reset signal VRSTAXj, and the reset circuit block 442 outputs a start signal VSTAXj for restarting the backward-direction application from the middle.

Figure 12:
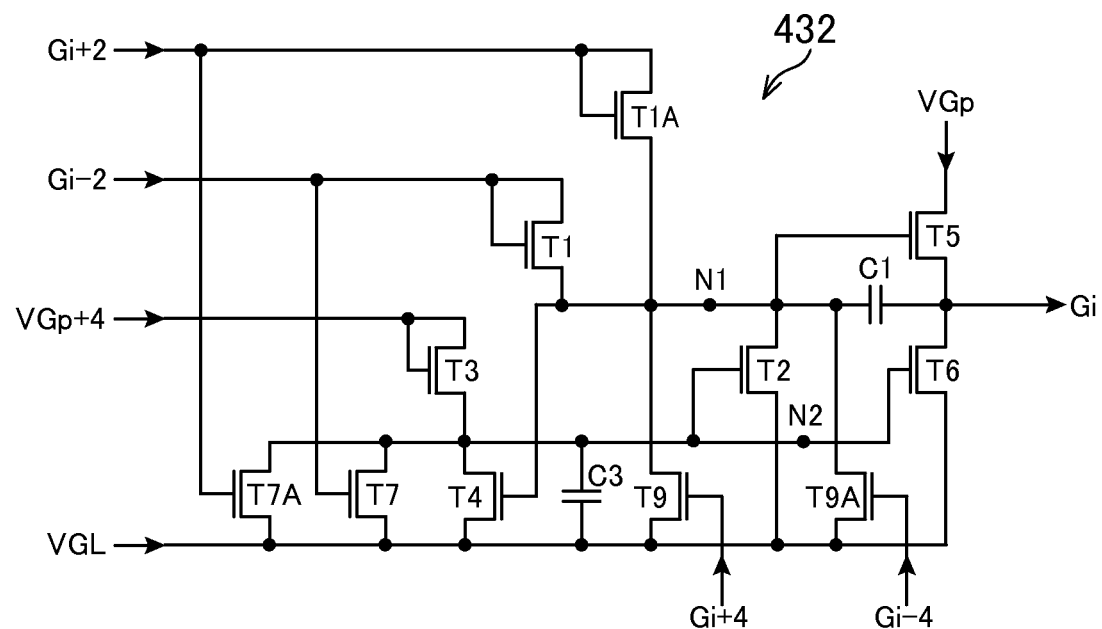
FIG. 12 is a circuit diagram showing a detail of an output circuit block which outputs a high potential to scanning signal lines.

FIG. 12 is a circuit diagram showing a detail of the output circuit block 432 which outputs a high potential to the scanning signal lines Gi. The output circuit block 432 includes three transistors, which operate during the scanning in the backward direction, in addition to the configuration of the output circuit block 332 in FIG. 6. The three transistors are a transistor T7A, a transistor T1A and a transistor T9A. The transistor T7A inputs a high potential to a scanning signal line Gi+2 and causes the potential of the node N1 to be a low potential. The transistor T1A similarly inputs a high potential to the scanning signal line Gi+2 and raises the voltage of the node N1. The transistor T9A inputs a high potential to a scanning signal line Gi−4 and lowers the voltage of the node N1. During the backward scanning, these transistors perform the same operations that the transistor T1, the transistor T7 and the transistor T9 in the output circuit block 332 perform during the forward scanning, respectively, and a repeated description thereof will be omitted.

Figure 13:
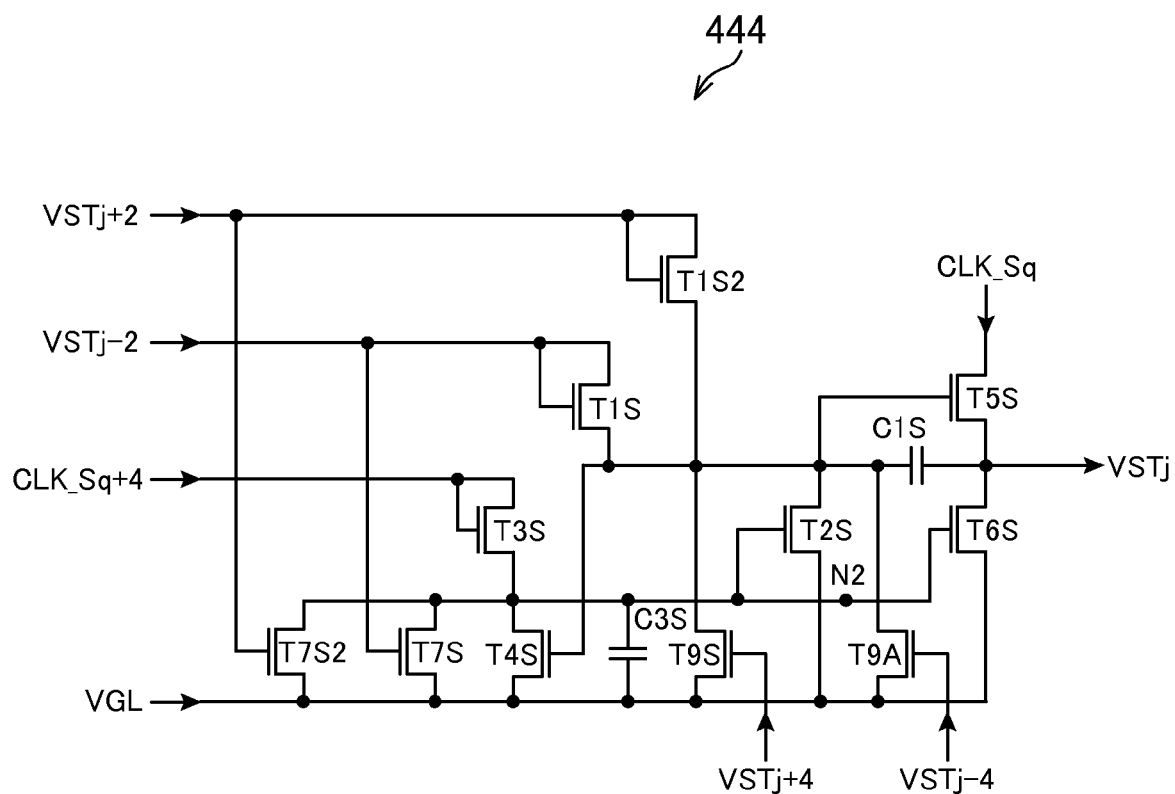
FIG. 13 is a circuit diagram showing a detail of a transfer circuit block in a reset start signal generation circuit unit.

FIG. 13 is a circuit diagram showing a detail of the transfer circuit block 444 in the reset start signal generation circuit unit 440 which outputs the transfer signal VSTj. Since the circuit is the same as the above circuit other than that a clock signal CLK_Sq operates at a lower frequency than that of the clock signal VGp of the output circuit block 432 in FIG. 12, a description of an operation thereof will be omitted.

Figure 14:
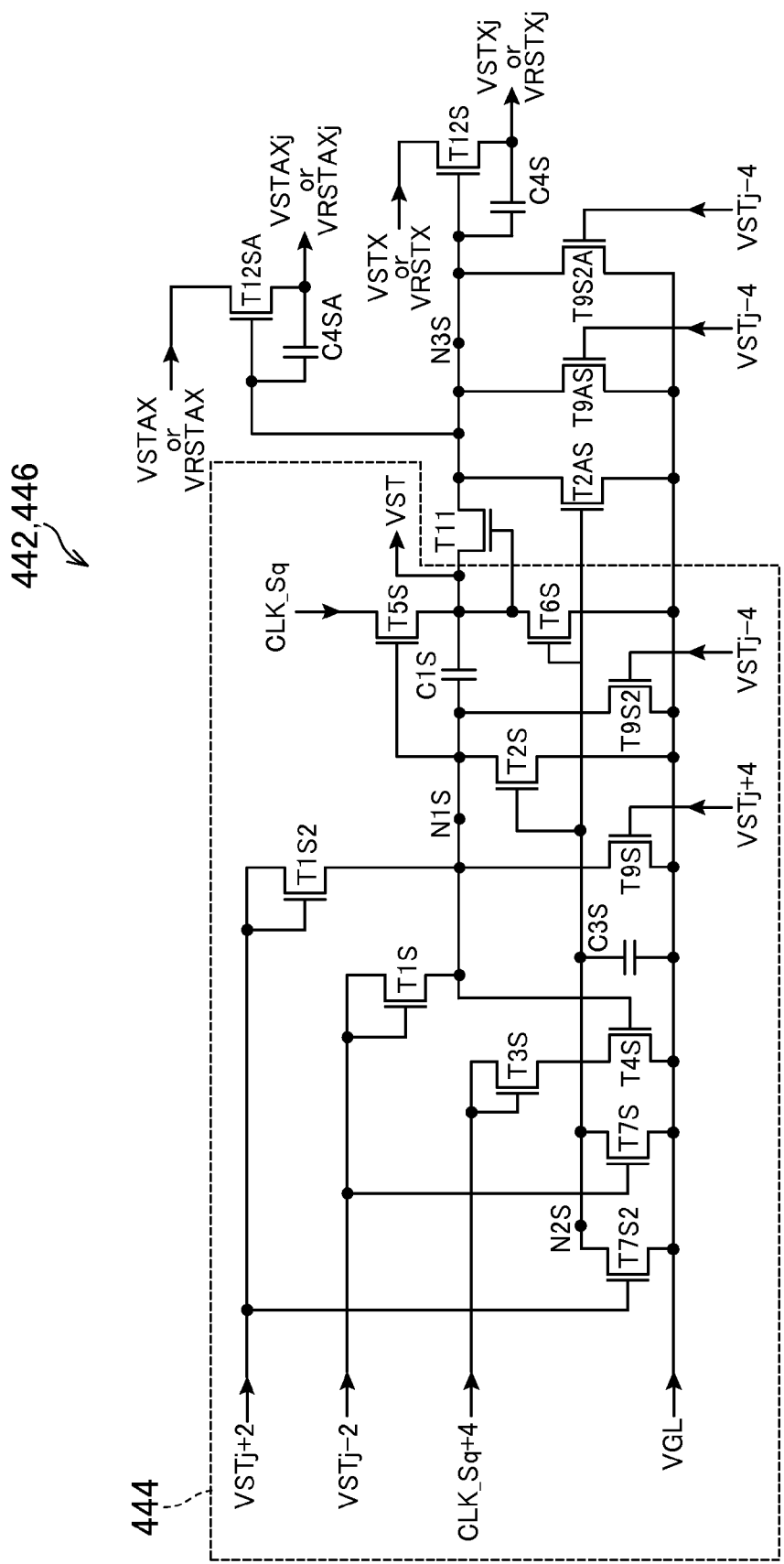
FIG. 14 is a circuit diagram showing a detail of a reset circuit block and a start circuit block.

FIG. 14 is a circuit diagram showing details of the reset circuit block 442 and the start circuit block 446. Basically the same circuits are used for the reset circuit block 442 and the start circuit block 446. In the case of the scanning in the forward direction, the reset circuit block 442 outputs a signal corresponding to the signal of the scanning signal line Gi+4 to the output circuit block 432 as the reset signal VRSTXj. In the case of the scanning in the forward direction, the start circuit block 446 outputs a signal corresponding to the signal of the scanning signal line Gi−2 to the output circuit block 432 as the start signal VSTXj.

In the case of the scanning in the backward direction, the reset circuit block 442 outputs a signal corresponding to the signal of the scanning signal line Gi+2 to the output circuit block 432 as the start signal VSTAXj. In the case of the backward direction, the start circuit block 446 outputs a signal corresponding to the signal of the scanning signal line Gi−4 to the output circuit block 432 as the reset signal VRSTAXj.

As described above, the reset circuit block 442 and the start circuit block 446 include the transfer circuit block 444. The output VSTj of the transfer circuit block 444 is input to the diode-connected transistor T11, a potential of the node N3S connected to gates of transistors T12S and T12SA becomes a high potential, and the reset signal VRSTXj or the start signal VSTXj is output by the input of the input signal VRSTX or VSTX, respectively, in the case of the scanning in the forward direction. The reset signal VRSTAXj or the start signal VSTAXj is output by the input of the input signal VRSTAX or VSTAX, respectively, in the case of the scanning in the backward direction. Transistors T2AS, T9AS, and T9S2A are transistors for fixing the potential of the node N3S to a low potential such that a signal is not output during a period other than the output period.

Figure 15:
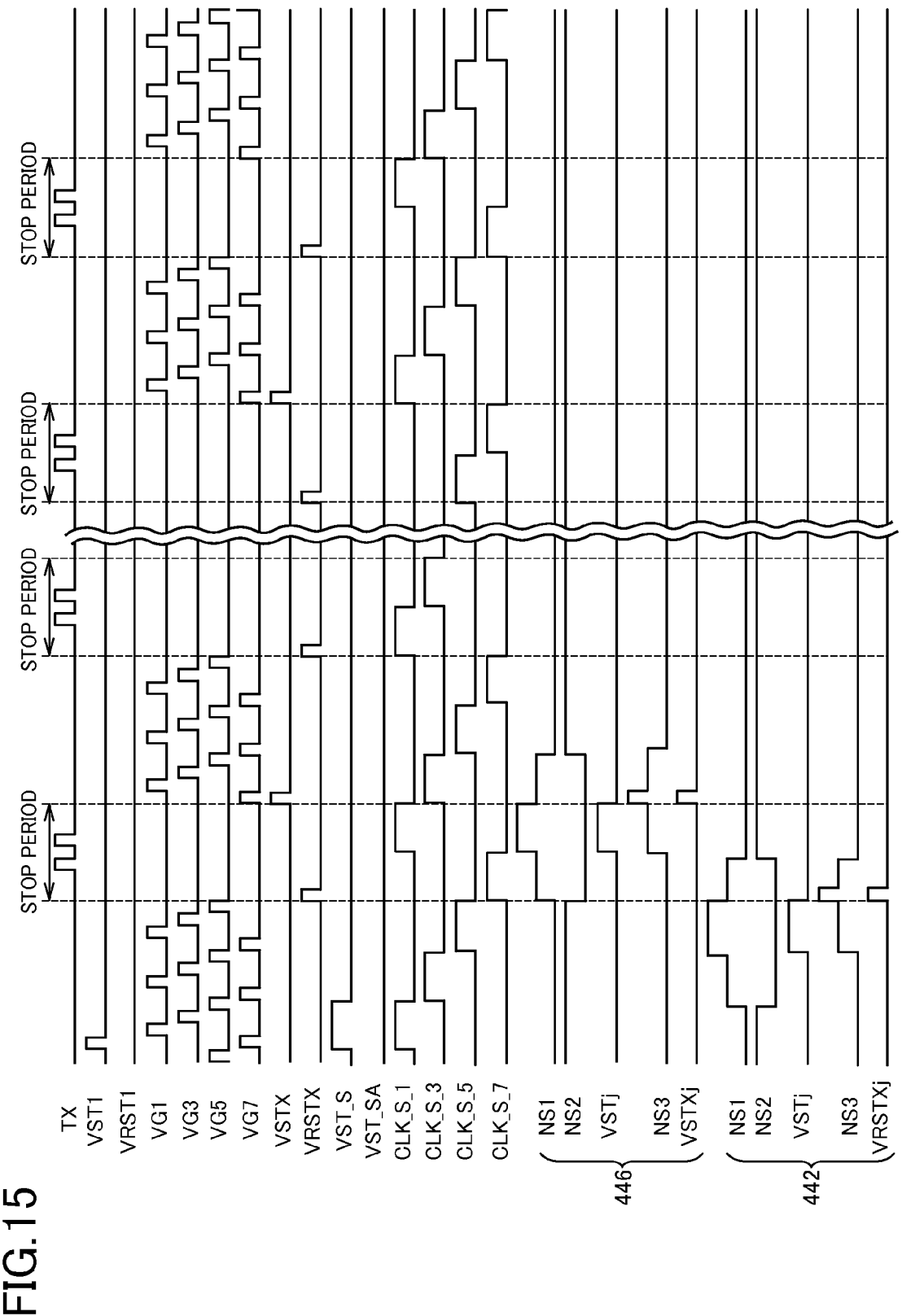
FIG. 15 is a timing chart showing variations in the respective signals in the left-side drive circuit in scanning in a forward direction.
Figure 16:
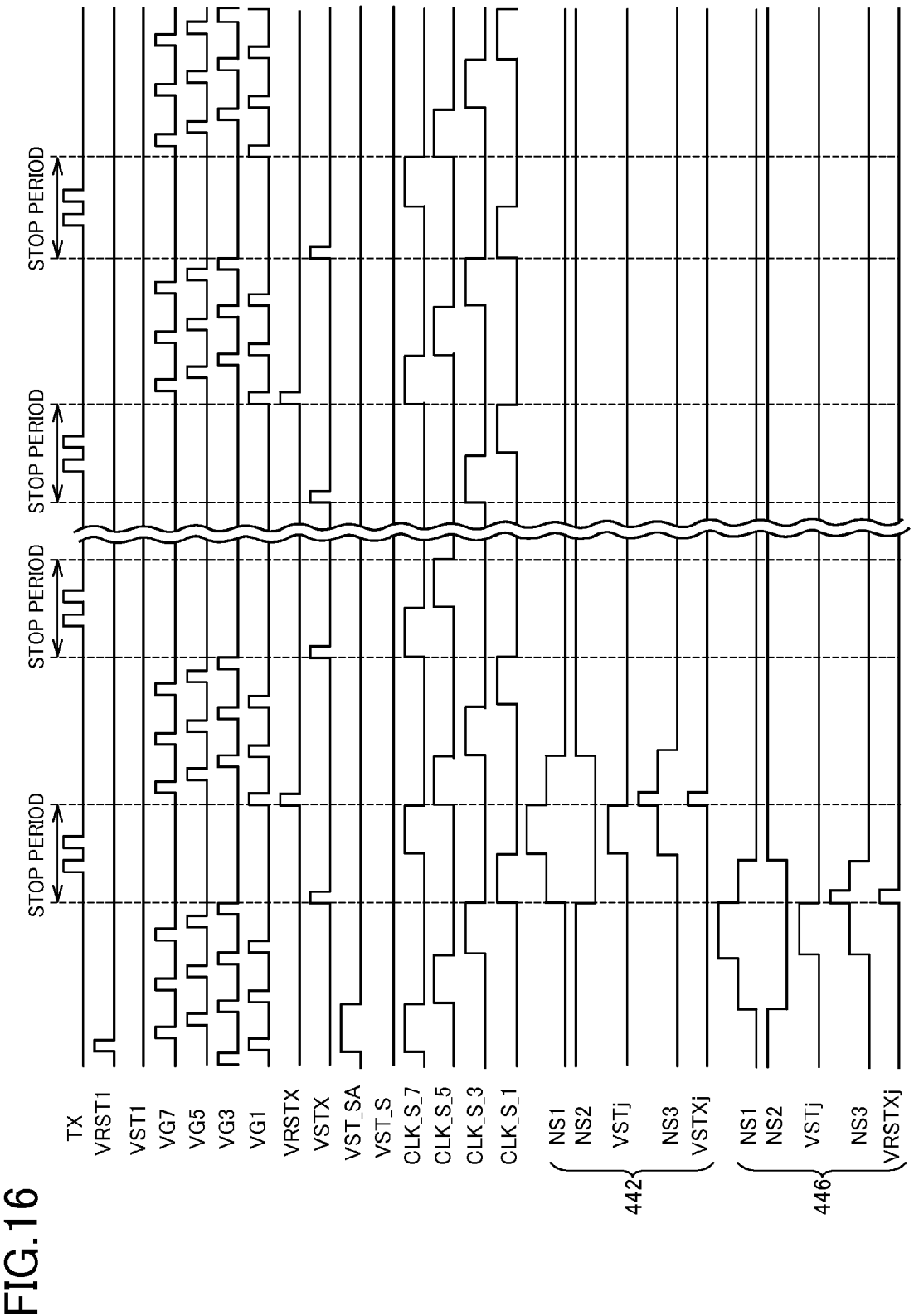
FIG. 16 is a timing chart showing variations in the respective signals in the left-side drive circuit in scanning in a backward direction.

FIGS. 15 and 16 are timing charts showing variations in the respective signals of the left-side drive circuit 420. FIG. 15 is a timing chart in the case of the scanning in the forward direction, and FIG. 16 is a timing chart in the case of the scanning in the backward direction. In both cases, the clock signals VG1, VG3, VG5, and VG7 form a four-phase clock signal in the same manner as in the case of FIG. 9, and an operation of sequentially outputting the clock signal to the eleven scanning signal lines Gi, temporarily stopping the output, and outputting the clock signal again to the eleven scanning signal lines Gi is repeated. In addition, the clock signals CLK_S_1, CLK_S_3, CLK_S_5, and CLK_S_7 are clock signals with longer cycles than those of the clock signals VG1, VG3, VG5, and VG7. FIGS. 15 and 16 differ from each other in that potentials of the clock signals VG1, VG3, VG5, and VG7 and the clock signals CLK_S_1, CLK_S_3, CLK_S_5, and CLK_S_7 become high potentials in the reverse order, and as a result, outputs to the scanning signal lines Gi are performed in the reverse direction, and the stop period occurs in the reverse direction.

According to the second embodiment, the same effects as those in the first embodiment can be achieved.

According to the display device with a touch panel according to the aforementioned embodiments, it is possible to stop the scanning during the display operation scanning period, perform the touch detection, and then start the scanning again as described above.

In addition, since the first clock signal to be output to the scanning signal lines is stopped, there is no voltage to be applied to the scanning signal lines due to leakage or the like of an output transistor, and the touch panel can perform touch detection scanning without being affected by noise in the display device.

In addition, the reset start signal generation circuit unit utilizes the second clock signal, namely the clock signals CLK_S_1, CLK_S_3, CLK_S_5, and CLK_S_7 with lower frequencies than those of the first clock signal, namely the clock signals VG1, VG3, VG5, and VG7, it is possible to reduce the circuit scale and mount the circuit without expanding the frame region which is formed outside the display region.

Although the drive pulse output circuits and the reset start signal generation circuit units are arranged on both sides of the display region in the aforementioned embodiments, the drive pulse output circuit and the reset start signal generation circuit units may be arranged on one side or may be formed in the drive IC mounted on the TFT substrate.

In both the first and second embodiments, the clock signal output period is a display data writing period during which display data is written in the pixel electrode in the display region, and the stop period is a touch drive detection period of the touch panel. A period during which the display data writing period and the touch drive detection period are alternately repeated a plurality of times is the display period, and a period, which is called a blanking period, during which no screen is displayed, is provided after the display period. In addition, one display period and one blanking period form one frame period.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A display device with a touch panel comprising:
a plurality of scanning signal lines, which are aligned in a rectangular display region and in parallel with a side of the rectangular display region, to which an active potential as a potential for making a pixel transistor conductive is applied;
at least one drive pulse output circuit which sequentially applies the active potential to the plurality of scanning signal lines in the display region;
a clock signal output circuit which applies a first clock signal as a clock signal for the drive pulse output circuits to a first clock signal line and stops the application of the first clock signal to the first clock signal line for a stop period during which the sequential application of the active potential to the plurality of scanning signal lines is stopped in the middle thereof;
a touch panel control unit which detects contact with a display surface during the stop period; and
at least one reset start signal generation circuit which includes a transfer circuit block, a reset circuit block and a start circuit block, and generates and outputs a reset signal for resetting the finally applied active potential to a non-active potential when the sequential application of the active potential by the drive pulse output circuit is stopped in the middle and a start signal for restarting the stopped sequential application of the active potential from the middle, wherein the transfer circuit block includes a circuit to be used by the respective circuit blocks in the reset start signal generation circuit to output a transfer signal, wherein the reset circuit block includes the circuit of the transfer circuit block, and generates and outputs the reset signal, wherein the start circuit block includes the circuit of the transfer circuit block, and generates and outputs the start signal, wherein the clock signal output circuit supplies a second clock signal, which is a clock signal with a lower frequency than that of the first clock signal, to the reset start signal generation circuit, and wherein the respective circuit blocks in the reset start signal generation circuit are operated based on the second clock.

2. The display device with a touch panel according to claim 1, wherein the drive pulse output circuit is arranged on the same substrate as a substrate, on which the plurality of scanning signal lines are formed, on an outer side of the rectangular display region, and wherein the reset start signal generation circuits are arranged between the driving pulse output circuit and an edge of the substrate.

3. The display device with a touch panel according to claim 1, wherein the at least one drive pulse output circuit comprises a plurality of drive pulse output circuits, wherein the at least one reset start signal generation circuit comprises a plurality of reset start signal generation circuits, wherein the drive pulse output circuits are respectively arranged at two locations outside facing sides of the rectangular display region and sequentially apply the active potential to odd-numbered scanning signal lines and even-numbered scanning signal lines, respectively, and wherein the reset start signal generation circuits are respectively arranged on further outside than the drive pulse output circuits arranged at the two locations outside the facing sides and supply the reset signal and the start signal to the drive pulse output circuits at the two locations, respectively.

4. The display device with a touch panel according to claim 1, wherein the reset start signal generation circuit includes a multi-stage circuit block as a circuit for sequentially outputting the active potential, and a circuit block corresponding to a part of the stages outputs the reset signal or the start signal to the scanning signal lines.

5. The display device with a touch panel according to claim 1, wherein the display device is a liquid crystal display device which controls an amount of transmitted light by controlling orientation of liquid crystal compositions by an electric field formed between a pixel electrode and a common electrode, and wherein the common electrode is divided into a plurality of electrodes, and at least a part of the plurality of electrodes is one of a pair of electrodes which forms capacity for detecting the contact.

* * * * *